United States Patent
Min

(10) Patent No.: US 7,489,660 B2
(45) Date of Patent: Feb. 10, 2009

(54) CIRCUIT FOR PREVENTING SIGNAL QUALITY DEGRADATION IN CDMA SYSTEM AND METHOD THEREOF

(75) Inventor: Kyung-Ho Min, Suwon (KR)

(73) Assignee: LG Electronics Inc., Seoul (KR)

( * ) Notice: Subject to any disclaimer, the term of this patent is extended or adjusted under 35 U.S.C. 154(b) by 875 days.

(21) Appl. No.: 10/392,927

(22) Filed: Mar. 21, 2003

(65) Prior Publication Data

US 2003/0185173 A1   Oct. 2, 2003

(30) Foreign Application Priority Data

Mar. 26, 2002  (KR) ............................... 2002-16362

(51) Int. Cl.
*H04Q 7/00* (2006.01)
(52) U.S. Cl. .................. 370/332; 370/342; 370/441; 375/308; 375/327; 375/344; 455/562.1
(58) Field of Classification Search ............... 370/332, 370/277, 342, 441; 375/327, 308, 344; 455/522, 455/562.1
See application file for complete search history.

(56) References Cited

U.S. PATENT DOCUMENTS

| 5,067,139 | A | * | 11/1991 | Baker et al. .................. 375/332 |
| 5,519,733 | A | * | 5/1996 | Huang ........................ 375/326 |
| 5,528,195 | A | * | 6/1996 | Lu et al. ..................... 329/308 |
| 6,072,785 | A | * | 6/2000 | Ho ............................. 370/320 |
| 6,236,687 | B1 | * | 5/2001 | Caso et al. .................. 375/327 |
| 6,507,628 | B1 | * | 1/2003 | McCallister et al. ........ 375/341 |
| 6,639,952 | B1 | * | 10/2003 | Meyer ........................ 375/327 |
| 6,678,012 | B1 | * | 1/2004 | Belotserkovsky ........... 348/731 |
| 6,904,098 | B1 | * | 6/2005 | Isaksen et al. .............. 375/261 |
| 7,076,008 | B2 | * | 7/2006 | Jeong ......................... 375/345 |
| 7,095,707 | B2 | * | 8/2006 | Rakib et al. ................ 370/204 |

* cited by examiner

*Primary Examiner*—Dwayne D Bost
*Assistant Examiner*—Inder P Mehra
(74) *Attorney, Agent, or Firm*—Ked & Associates LLP

(57) ABSTRACT

A system for preventing signal quality degradation in a CDMA system includes a phase locking unit for controlling a phase of an oscillating frequency signal by controlling a voltage control oscillation unit, a mixer for mixing a frequency oscillation signal and a radio frequency signal received through an antenna, a demodulator for demodulating a signal output from the mixer, a signal detection unit for detecting a signal demodulated by the demodulator, a comparison unit for calculating a constellation and an error vector of the signal detected by the signal detection unit and comparing the constellation and error vector to a setup reference signal, and a controller means for controlling the phase locking unit, mixer and demodulator selectively in accordance with a comparison result of the comparison unit so as to make the constellation and error vector of the signal coincide with the reference signal. The system, thus, prevents the degradation of signal quality and call disconnection occurring during calling.

32 Claims, 5 Drawing Sheets

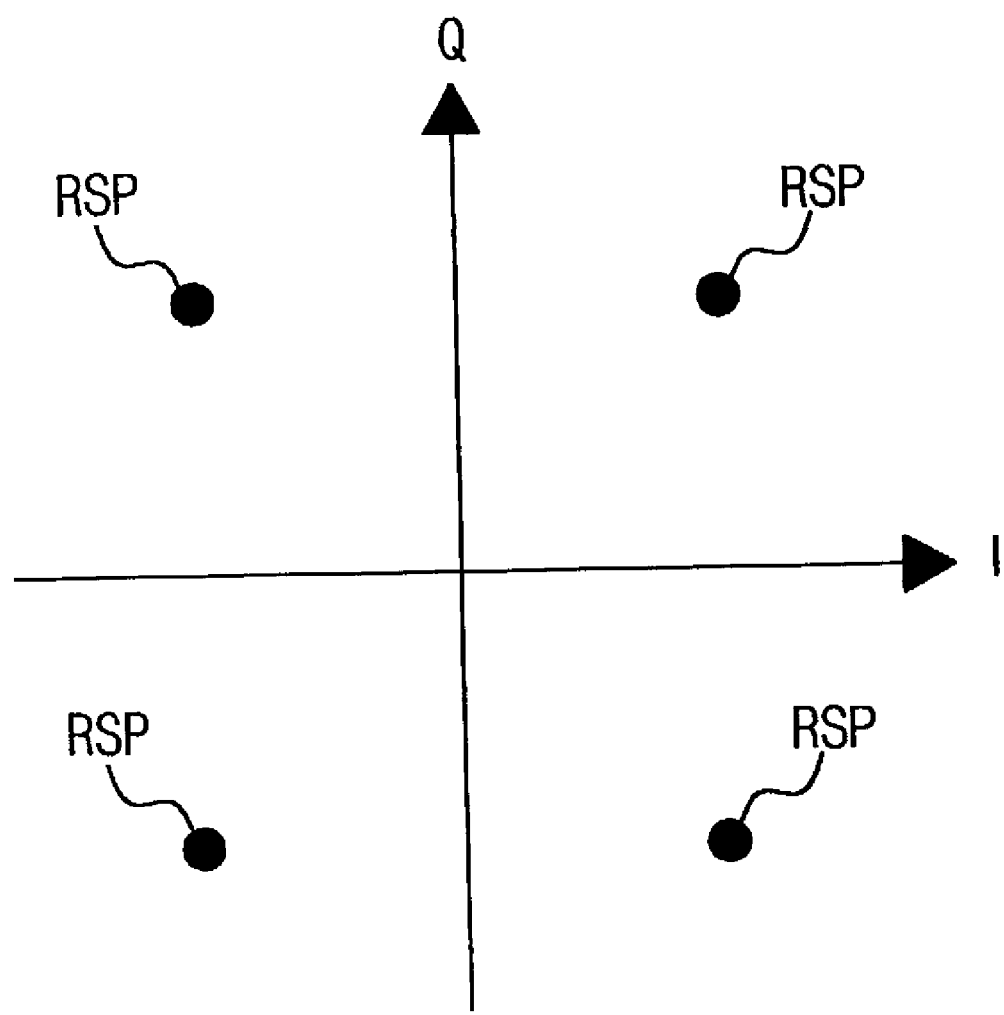

CIRCUIT FOR PREVENTING SIGNAL QUALITY DEGRADATION IN CDMA SYSTEM AND METHOD THEREOF

BACKGROUND OF THE INVENTION

1. Field of the Invention

The present invention relates to communications systems, and more particularly to a system and method for preventing signal quality degradation in a CDMA system.

2. Background of the Related Art

In a communications system using a CDMA modem system, interference signals or spurs occur during a call which tends to degrade calling quality. The degradation of calling quality in a related art system is explained as follows.

FIG. 1 illustrates a block diagram of a receiving circuit using a general CDM modem system. This circuit includes a low-noise amplifier (LNA) 111, a first band-pass filter (BPF) 112, a phase locked loop (PLL) 113, a voltage control oscillator (VCO) 114, a frequency mixer 115, a second band-pass filter 116, a demodulator 117, a low-pass filter(LPF) 118, an analog-digital converter 119, and a baseband modem 120. In the drawing, 'I', 'Q', 'RF', and 'IF' indicate coherent phase data, quadrature phase data, radio frequency signal, and intermediate signal respectively.

In the above-constituted CDMA receiving circuit, an RF signal input in to the antenna is amplified by low-noise amplifier 111, passed through first band-pass filter 112 to remove unnecessary wave components of the RF signal, and then input into frequency mixer 115. The RF signal is mixed with an output signal of the voltage control oscillator 114, which is controlled by phase locked loop 114. The frequency mixing converts the RF signal into an IF signal, which is then passed through second band-pass filter 116 and then input into demodulator 117. The demodulator transforms the IF signal into baseband I and Q signals and the demodulated signals pass through low-pass filter 118. Analog-digital converter 119 converts the signals into digital data which is then passed to baseband modem 120 so that an original signal may be regenerated In the receiving circuit of the related art, an interference signal or spur may occur or exist on carrier feedthrough or calling. This signal or spur is undesirable because it has a severe influence on calling quality. Such an interference signal can be generated from various factors such as test radio waves, interference between the same or adjacent cells, frequency reuse, and the like. If the power of the interference signal source is greater than a level of the current call power, call disconnection and/or degradation of call quality may occur. Furthermore even if the power of the interference signal is smaller than the level of the current call power, the quality is often affected to some extent.

A need therefore exists for a system and method for improving call quality in a communications system, and more particularly ones which prevent signal degradation in a CDMA system as a result of spur or interference signals.

SUMMARY OF THE INVENTION

An object of the present invention is to provide a system and method for preventing signal quality degradation in a CDMA system.

Another object of the present invention is to provide a system and method of the aforementioned type which prevents degradation of signal quality by controlling a phase locked loop to remove interference signals or spur components by searching a signal demodulated in a receiving end of a CDMA modem system.

Another object of the present invention is to provide a system and method for preventing signal quality degradation in a CDMA system by controlling a demodulator and a phase locked loop to control an interference signal or spur component after a signal demodulated in a receiving end of a CDMA modem system is detected, so as to be compared to a setup reference signal.

To achieve these and other objects and advantages, the present invention provides a circuit for preventing signal quality degradation in a CDMA system which includes a phase locking unit for controlling a phase of an oscillating frequency signal by controlling a voltage control oscillation unit, a mixing unit for mixing a frequency signal oscillated by a control of the phase locking unit with a radio frequency signal received through an antenna, a demodulating unit for demodulating a signal having passed the frequency mixing unit, a signal detection unit for detecting a signal demodulated by the demodulating unit, a comparison unit for calculating a constellation and an error vector of the signal detected by the signal detection unit and comparing the constellation and error vector to a setup reference signal, and a control unit for controlling the phase locking unit, frequency mixing unit, and demodulating unit selectively in accordance with a comparison result of the comparison unit so as to make the constellation and error vector of the signal demodulated by the demodulating unit coincide with the reference signal.

In another aspect of the present invention, a method for preventing signal quality degradation in a CDMA system includes a first step of detecting signals I and Q respectively when a radio frequency signal received to a CDMA receiving end through an antenna passes a demodulating means, a second step of comparing the detected signals I and Q to a setup value so as to calculate a size of a constellation and an error vector magnitude and comparing the size of the constellation and the error vector magnitude to a predetermined reference value, and a third step of, if the error vector magnitude of the detected signal is greater than the reference value as a result of the comparison, controlling a frequency mixing means and the demodulating means so as to improve the signal quality.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
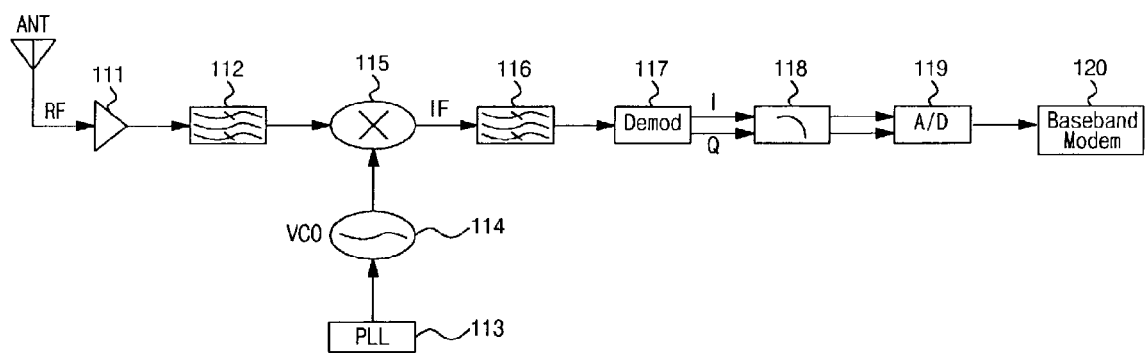
FIG. 1 is a block diagram of a receiving circuit using a general CDMA modem system.
Figure 2:
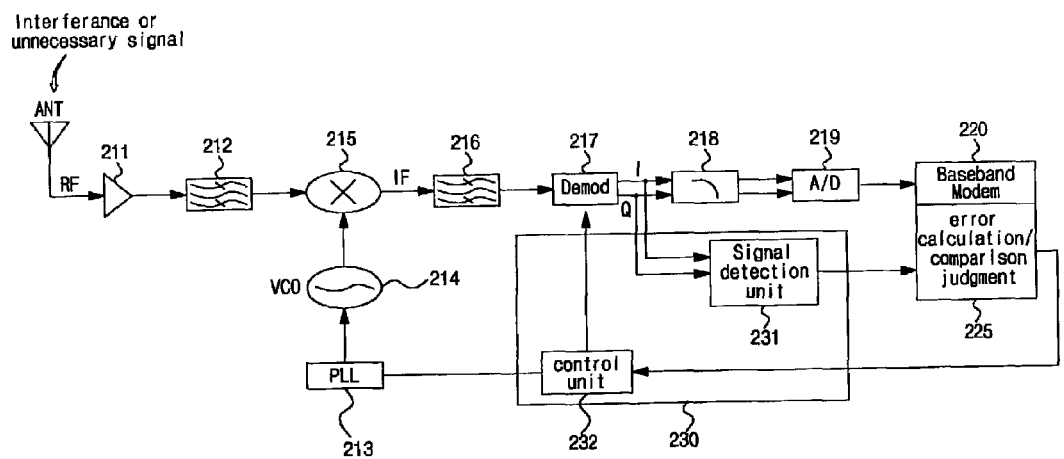
FIG. 2 is a block diagram of a circuit for preventing signal quality degradation in a CDMA system according to an embodiment of the present invention.

FIG. 2 is a block diagram of a circuit for preventing signal quality degradation in a CDMA system according to an embodiment of the present invention. As shown, this circuit is applied to a CDMA receiving end and includes a low-noise amplifier 211, a first band-pass filter 212, a phase locked loop 213, a voltage control oscillator 214, a frequency mixer 215, a second band-pass filter 216, a demodulator 217, a low-pass filter 218, and an analog-digital converter 219. The circuit also includes a baseband modem 220 which has or is connected to a comparison unit. This unit is then connected to a signal detection control unit 230. In this case, 'I', 'Q', 'RF', and 'IF' indicate a coherent phase data, quadrature phase data, radio frequency signal, and intermediate signal, respectively.

The comparison unit and the signal detection control unit are especially advantageous features of the present invention. By using these elements, degradation in signal quality in a CDMA receiver resulting from internal factors, external interference signals, or spur will be prevented. Such signal degradation can be seen by comparing a signal which has passed through the demodulator to a reference signal.

FIG. 3(a) is a vector diagram showing demodulated data output from demodulator 217 which does not include an interference signal. FIG. 3(a) shows a pattern of quadrature phase shift keying (QPSK) CDMA demodulated data in a case where an external interference signal does not exist. This pattern corresponds to a pattern displayed on an oscilloscope.

Figure 3B:
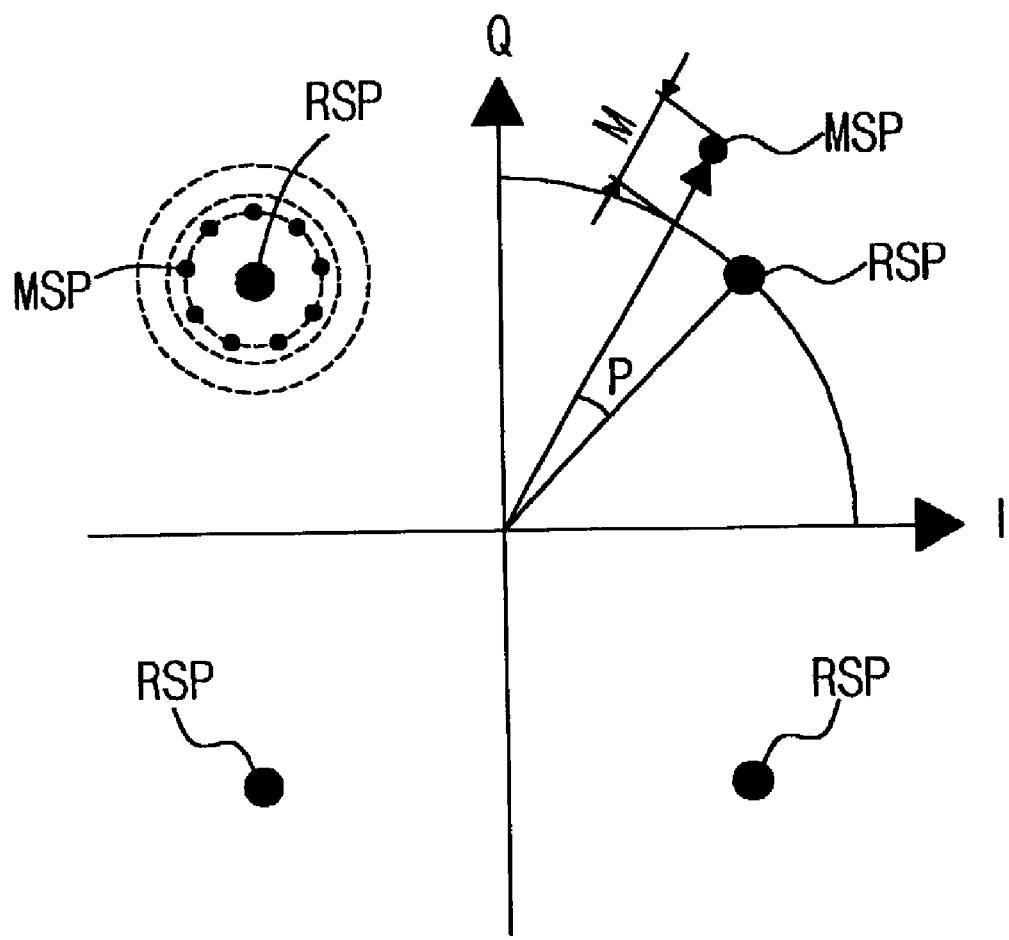
FIGS. 3(a) and (b) are vector diagrams of demodulated data which do and do not include an interference signal.

FIG. 3(b) is a diagram to explain a constellation pattern obtained from quadrature phase shift keying (QPSK) CDMA demodulated data in a case where an external or internal interference signal exists in a calling band. In FIGS. 3(a) and (b), RSP means a Reference Signal Position, MSP means a Measured Signal Position, M indicates an error magnitude, P indicates a phase error. If an interference signal exists, the output signal from the demodulator 217 has different phase P and magnitude M. The M and P are varied around the Reference Signal. When the signal having Variation of the M and P is plotted, it will be shown in a second quadrant as a circle. If the interference signal gives a serious effects, the circle will have a large radius, in other words the variation of the signal vector points are scatters in a large area. By comparing the vector diagrams of FIGS. 3(a) and 3(b), it is clear that when the external interference signal exists, a data value relating to the quality of a waveform is substantially degraded. In more in-depth description of this degradation and the manner in which the present invention reduces or eliminates these effects to improve signal quality will now be given.

In the case where carrier feedthrough is abundant in the demodulator 217 or an interference signal exists in the relevant calling band, a constellation pattern of the demodulated signal, as shown in FIG. 3(b), is scattered in the form of a circle when compared to that of a reference signal. The extent of the scattering tends to increase as the size of the carrier feedthrough or interference signal increases. Such a phenomenon results from the fact that a phase of the signal varies within a predetermined range, and that also the size of the signal fails to be uniform. Moreover, an error vector magnitude (EVM) of the system is reduced remarkably, and if the extent is great, the signal quality is seriously degraded.

In FIG. 3(b), the constellation is scattered by carrier feedthrough since the I and Q data of the demodulator 217 are unbalanced from each other. Also, the matching of the frequency mixer 215 is poor. The Inventors of the present invention have determined that the scattering of the constellation caused by carrier feedthrough can be improved in at least one way using a control unit 232.

More specifically, one embodiment of the present invention contemplates adding a comparison unit 225 for calculating error and comparing, a control unit 232, and a baseband modem 220 in a CDMA receiver. The comparison unit calculates a constellation pattern and an error of a signal and compares them to setup reference signals.

In operation, the signal detection unit 231 detects components causing a degradation in signal quality such as an interference signal or spur included in a signal output from demodulator 217. The comparison unit receives a signal from the signal detection unit 231 and then calculates a constellation pattern and error vector of the signal. This unit also performs a comparison judgment with setup reference signals. The control unit 232 controls demodulator 217 and phase locked loop 213 in order to remove components such as the interference signal, spur, and the like in accordance with an output result of comparison unit 225. In this case, the comparison unit may include a microprocessor which calculates the constellation pattern and error vector of the signal from the signal detection unit. The microprocessor may be an element of the general baseband modem or a new element installed therein.

The control unit controls a phase angle of the phase locked loop to change an oscillation frequency of the VCO so as to improve the matching of the frequency mixer 215, as well as to reduce carrier feedthrough. The control unit also controls a sensitivity of a local oscillation frequency so as to improve an imbalance between the I and Q signals.

Moreover, if the interference signal or spur in the band exists so that the signal quality is unable to be improved even through control of the frequency mixer 215 and demodulator 217, then according to one aspect of the invention a channel used by controlling the phase locked loop 213 in the control unit is handed off to another frequency band in order to escape the influence of the interference signal or spur. This is described in greater detail below.

Figure 4:
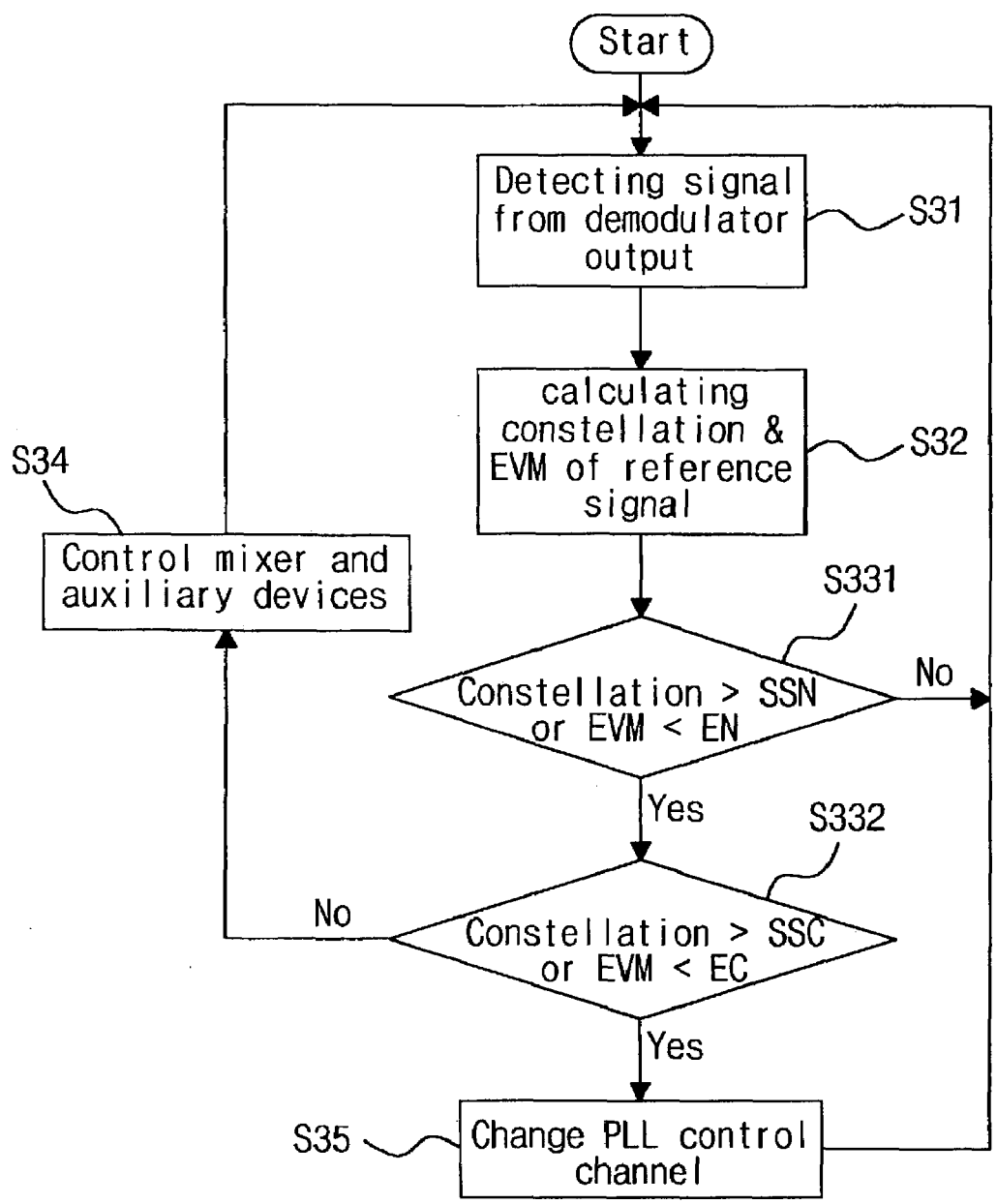
FIG. 4 is a flowchart showing steps included in a method for preventing signal quality degradation of a CDMA system according to an embodiment of the present invention.

FIG. 4 is a flowchart showing steps included in a method performed by the comparison unit. In a CDMA receiving end of the embodiment of the present invention, a signal passing through demodulator 217 is detected and compared to a reference signal. The carrier feedthrough is then improved or a channel frequency being used is changed in accordance with an error vector magnitude (EVM) and a form of a constellation.

More specifically, a signal received through the antenna passes through low-noise amplifier 211 and first band-pass filter 212, is mixed in frequency mixer 215 with an oscillation frequency output from voltage control oscillator 214, which is controlled by phase locked loop 213, and then passed through the second band-pass filter 216. The signal output from the second band-pass filter is demodulated by demodulator 217. The demodulated signal is then divided into signals I and Q and applied to low-pass filer 218 as well as signal detection unit 231.

The signal detection unit 231 detects components in the demodulated signal as factors for judging signal quality, for example, a distribution form or I and Q signal, differences of phase/magnitude between reference signal and detected signals, etc. and more specifically whether an interference signal or spur exists in the I and Q signals output from demodulator 217(S31).

A signal output from signal detection unit 231 is applied to comparison unit 225 of the baseband modem. The comparison unit calculates a constellation pattern and error vector magnitude of the demodulated I and Q signals. The error vector magnitude value is then compared to a reference value (S32). The reference value is stored initially in system or down loaded from the station. The comparison unit carries out judgment as to whether the error vector magnitude of the demodulated signal exceeds a setup reference value (ex. 0.95) and whether the constellation pattern of the demodulated signal corresponds to a form of reference signal.

In performing this function, a first check is carried out to judge whether the constellation is greater than a reference value SSN or whether the error vector magnitude (EVM) is smaller than the reference value EN (S331). The SSN is maximum value of radius of a constellation circle for detecting an error and compensating the data. EN is minimum value of error vector magnitude for detecting an error and compensating the data. The EN should be grater than 0.944 in Standard Regulation (EN≧0.944). The SSN could be represented by radius of the circle as shown in FIG. 3(b), and the SSN may be predetermined by the designer. If results of both cases are 'NO', the signal remains in a normal range. Hence, The process is repeated beginning with step S31.

If at least one of the first check results in a 'YES' answer in the step S331, a second check is performed to judge whether the constellation pattern is greater than a critical reference value SSC or whether the error vector magnitude (EVM) is smaller than the critical reference value EC (S332). For example, SSC=0.9, EC=0.96 while SSN=1, EN=0.944.

If the results of both cases are 'NO', the comparison unit instructs the control unit 232 to output signals to frequency mixer 215 and demodulator 217 to improve the signal quality. The control unit thus carries out an operation for improving the signal quality. The control unit 232 controls for improving the signal quality by amplifying or changing I, Q value of the reference data( changeability is depend upon demod. or baseband chip) so that may lessen a radius of the constellation circle. If the interference signal is severe and improving quality is impossible, the control unit signals to PLL 213 to change a frequency so the present channel is changed to a different channel.

If at least one of the second check results is 'YES', comparison unit instructs the control unit to output a signal to PLL 213 to change a previous channel into another channel. (S35). The control unit thus carries out the control operation for changing the channel.

In summary, in accordance with a comparison result from the comparison unit, if the constellation is smaller than or equal to the normal reference value and the error vector magnitude of the demodulated signal is greater than or equal to the setup normal reference value, an operation for performing signal quality improvement is not carried out.

If it is judged that the constellation is greater than or equal to the critical reference value or the error vector magnitude of the demodulated signal is smaller than or equal to the setup critical reference value, control unit 232 controls the phase locked loop 213 to the channel (frequency) being used. In this case, the channel which includes the interference signal or spur in the band is moved or changed based on a 'Hand-off' operation in order to escape influence of the corresponding interference signal and the like (S35).

If the constellation is between the normal and critical reference values and the error vector magnitude is between the normal and critical reference values, the control unit 232 controls the frequency mixer 215 and demodulator 217 in order to control the error vector magnitude. Hence, the improvement of the error vector magnitude is achieved (S34).

Thus, the signals I and Q having passed the demodulator 217 are detected so as to be compared to the reference signal. If the corresponding constellation is scattered to be distributed centering around an origin or the error vector magnitude becomes smaller than or equal to the reference value, the unbalance between the signals I and Q of the frequency mixer 215 and demodulator 217 is corrected or the movement of the calling channel is carried out by controlling the phase locked loop 213.

In the circuit for preventing signal quality degradation of a CDMA system and operating method thereof according to the present invention, if the degradation is generated from the inside of the system in the receiving end using the CDMA modem system, the degradation is reduced to some extent through the control of the control unit. And, if the degradation is caused by the external interference, the channel of the terminal is handed off so as to escape from the influence of the interference signal. Therefore, the present invention prevents the degradation of signal quality and call disconnection occurring during calling, thereby enabling to provide the improved communication services.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A system for preventing signal quality degradation in a CDMA system, comprising:

a phase locking circuit which controls a phase of oscillating frequency signal;

a mixer which mixes the oscillating frequency signal and a radio frequency signal received through an antenna;

a demodulator which demodulates a signal output from the mixer;

a signal detector which detects a demodulated signal output from the demodulator;

a processor which calculates at least one of a constellation pattern and an error vector of the demodulated signal detected by the detector and compares at least one of the constellation pattern or the error vector to one or more corresponding reference signals; and a controller which controls at least one of the phase locking circuit, mixer, or demodulator in accordance with a comparison result of the comparison so as to make the constellation pattern or error vector fall within predetermined ranges based on said one or more corresponding reference signals, wherein the controller controls at least one of the phase locking circuit, mixer, or demodulator to adjust a radius and phase of the constellation pattern to cause the constellation pattern to fall within a first predetermined range or to adjust a magnitude and phase of the error vector to cause the error vector to fall within a second predetermined range, and wherein at least the radius of the constellation pattern is increased to exceed the first predetermined range or at least the magnitude of the error vector is increased to exceed the second predetermined range as a result of distortion affecting the received radio frequency signal, and wherein the radius of the constellation pattern or the magnitude of the error vector is reduced by the controller to substantially coincide with a reference signal position, the radius or magnitude reduced to offset the increase in the radius or magnitude caused by the distortion affecting the received radio frequency signal.

2. The system of claim 1, wherein the signal detector detects at least one of an interference signal and a spur from the signal which passed through the demodulator, and wherein the controller selectively controls at least one of the phase locking circuit, mixer, or demodulator to reduce the radius of the constellation pattern or the magnitude of the error vector to remove the detected interference signal or spur.

3. The system of claim 1, wherein the processor includes a microprocessor for calculating the constellation pattern or error vector of the signal output from the signal detector.

4. The system of claim 1, wherein the controller controls at least one of the phase locking circuit, mixer, or demodulator to reduce the radius and adjust the phase of the constellation pattern to within the first predetermined range when the constellation pattern calculated by the processor is greater than a first reference value but less than a second reference value.

5. The system of claim 4, wherein the first reference value corresponds to a predetermined value of the radius of the constellation pattern for detecting error to be compensated and the second reference value corresponds to a critical reference value.

6. The system of claim 5, wherein said predetermined value corresponds to a maximum value of the radius of the constellation pattern for detecting error to be compensated.

7. The system of claim 4, wherein the controller controls at least one of the mixer or demodulator to reduce the radius and adjust the phase of the constellation pattern to within the first predetermined range when the constellation pattern calculated by the processor is greater than a first reference value but less than a second reference value.

8. The system of claim 1, wherein the controller controls at least one of the phase locking circuit, mixer, or demodulator to reduce the magnitude and adjust the phase the error vector to cause the error vector to fall within the second predetermined range when the error vector is less than a first reference value but greater than a second reference value.

9. The system of claim 8, wherein the first reference value corresponds to a predetermined value of the error vector for detecting error to be compensated and the second reference value corresponds to a critical reference value.

10. The system of claim 9, wherein the predetermined value is a minimum value for detecting error to be compensated.

11. The system of claim 8, wherein the controller controls at least one of the mixer or demodulator to reduce the magnitude and adjust the phase of the error vector to within the second predetermined range when the error vector is less than a first reference value but greater than a second reference value.

12. The system of claim 1, wherein the controller controls at least one of the phase locking circuit, mixer, or demodulator to reduce the radius and adjust the phase of the constellation pattern to within the first predetermined range when the constellation pattern calculated by the processor is greater than a first reference value and the error vector is greater than a second reference value.

13. The system of claim 12, wherein the first reference value corresponds to a predetermined value of the radius of the constellation pattern for detecting error to be compensated and the second reference value corresponds to a critical reference value.

14. The system of claim 1, wherein the controller controls at least one of the phase locking circuit, mixer, or demodulator to reduce the magnitude and adjust the phase the error vector to cause the error vector to fall within the second predetermined range when the error vector is less than a first reference value and the constellation pattern is less than a second reference value.

15. The system of claim 14, wherein the first reference value corresponds to a predetermined value for detecting error to be compensated and the second reference value is a critical reference value.

16. The method of claim 1, wherein the first predetermined range is different from the second predetermined range.

17. The method of claim 1, wherein the reference signal position is different from said one or more corresponding reference signals.

18. A method of preventing signal quality degradation in a CDMA system, comprising:
  detecting I and Q signals from a received signal;
  calculating at least one of a constellation pattern or an error vector from the I and Q signals;
  comparing at least one of the constellation pattern or the error vector to one or more corresponding reference signals; and
  controlling at least one of a phase locking circuit, mixer, or demodulator in accordance with a result of the comparison to make the constellation pattern or error vector fall within predetermined ranges based on said one or more corresponding reference signals, said controlling including:
  adjusting a radius and phase of the constellation pattern to cause the constellation pattern to fall within a first predetermined range, or adjusting a magnitude and phase of the error vector to cause the error vector to fall within a second predetermined range,
  wherein at least the radius of the constellation pattern is increased to exceed the first predetermined range or at least the magnitude of the error vector is increased to exceed the second predetermined range as a result of distortion affecting the received signal, and
  wherein the radius of the constellation pattern or the magnitude of the error vector is reduced to substantially coincide with a reference signal position, the radius or magnitude reduced to offset the increase in the radius or magnitude caused by distortion affecting the received signal.

19. The method of claim 18, wherein said controlling includes:
  controlling at least one of the phase locking circuit, mixer, or demodulator to reduce the radius and adjust the phase of the constellation pattern to within the first predetermined range when the constellation pattern calculated by the processor is greater than a first reference value but less than a second reference value.

20. The method of claim 19, wherein the first reference value corresponds to a predetermined value of the radius of the constellation pattern for detecting error to be compensated and the second reference value corresponds to a critical reference value.

21. The method of claim 20, wherein said predetermined value corresponds to a maximum value of the radius of the constellation pattern for detecting error to be compensated.

22. The method of claim 19, wherein said controlling includes:
  controlling at least one of the mixer or demodulator to reduce the radius and adjust the phase of the constellation pattern to within the first predetermined range when the constellation pattern calculated by the processor is greater than a first reference value but less than a second reference value.

23. The method of claim 18, wherein said controlling includes:
  controlling at least one of the phase locking circuit, mixer, or demodulator to reduce the magnitude and adjust the phase the error vector to cause the error vector to fall within the second predetermined range when the error vector is less than a first reference value but greater than a second reference value.

24. The method of claim 23, wherein the first reference value corresponds to a predetermined value of the error vector for detecting error to be compensated and the second reference value corresponds to a critical reference value.

25. The method of claim 24, wherein the predetermined value is a minimum value for detecting error to be compensated.

26. The method of claim 23, wherein said controlling includes:
    controlling at least one of the mixer or demodulator to reduce the magnitude and adjust the phase the error vector to within the second predetermined range when the error vector is less than a first reference value but greater than a second reference value.

27. The method of claim 18, wherein said controlling includes:
    controlling at least one of the phase locking circuit, mixer, or demodulator to reduce the radius and adjust the phase of the constellation pattern to within the first predetermined range when the constellation pattern calculated by the processor is greater than a first reference value and the error vector is greater than a second reference value.

28. The method of claim 27, wherein the first reference value corresponds to a predetermined value of the radius of the constellation pattern for detecting error to be compensated and the second reference value corresponds to a critical reference value.

29. The method of claim 18, wherein said controlling includes:
    controlling at least one of the phase locking circuit, mixer, or demodulator to reduce the magnitude and adjust the phase the error vector to cause the error vector to fall within the second predetermined range when the error vector is less than a first reference value and the constellation pattern is less than a second reference value.

30. The method of claim 29, wherein the first reference value corresponds to a predetermined value for detecting error to be compensated and the second reference value is a critical reference value.

31. The method of claim 18, wherein the first predetermined range is different from the second predetermined range.

32. The method of claim 18, wherein the reference signal position is different from said one or more corresponding reference signals.

* * * * *